(12) United States Patent
Doron et al.

(10) Patent No.: US 8,675,720 B2
(45) Date of Patent: Mar. 18, 2014

(54) NOISE ESTIMATION FILTER

(75) Inventors: Ayelet Doron, Modi'in (IL); Vladimir Kravtsov, Jerusalem (IL); Yuval Lomnitz, Herzelia (IL)

(73) Assignee: Intel Corporation, Santa Clara, CA (US)

( * ) Notice: Subject to any disclaimer, the term of this patent is extended or adjusted under 35 U.S.C. 154(b) by 326 days.

(21) Appl. No.: 13/174,327

(22) Filed: Jun. 30, 2011

(65) Prior Publication Data

US 2013/0003802 A1    Jan. 3, 2013

(51) Int. Cl.
- *H04B 3/46* (2006.01)
- *H04B 17/00* (2006.01)
- *H04Q 1/20* (2006.01)

(52) U.S. Cl.
USPC .......................................... 375/224; 375/260

(58) Field of Classification Search
USPC ................................................. 375/224, 260
See application file for complete search history.

(56) References Cited

U.S. PATENT DOCUMENTS

| | | | |
|---|---|---|---|
| 2005/0105657 A1* | 5/2005 | Kroeger et al. | 375/347 |
| 2006/0109922 A1 | 5/2006 | Gorokhov et al. | |
| 2006/0154608 A1 | 7/2006 | Fukuoka et al. | |
| 2007/0058740 A1 | 3/2007 | Akahori | |
| 2009/0122900 A1 | 5/2009 | Mege et al. | |
| 2009/0247107 A1 | 10/2009 | Roy et al. | |
| 2010/0067366 A1 | 3/2010 | Nicoli | |

FOREIGN PATENT DOCUMENTS

| | | |
|---|---|---|
| WO | 2013/003589 A2 | 1/2013 |
| WO | 2013/003589 A3 | 4/2013 |

OTHER PUBLICATIONS

International Search Report and Written Opinion received for PCT application No. PCT/US2012/044643, mailed on Feb. 1, 2013, 9 pages.

* cited by examiner

*Primary Examiner* — Shuwang Liu
*Assistant Examiner* — Nader Bolourchi
(74) *Attorney, Agent, or Firm* — Thorpe North & Western LLP (57) ABSTRACT

A noise estimation filter for an orthogonal frequency-division multiplexed (OFDM) system can include a filter bank module, a coefficient squaring module, and a summing module. The filter bank module can multiply a unitary vector by an OFDM signal vector to generate scalar products of the OFDM signal vector. The coefficient squaring module can square the scalar products and weight the scalar products to generate a plurality of weighted single estimates. The coefficient squaring module can include a squaring module for squaring the scalar product to generate a plurality of single estimates and a coefficient multiplication module for weighting each of the single estimates with a noise coefficient forming a plurality of weighted single estimates. The summing module can sum the weighted single estimates to generate a noise and interference power estimate.

20 Claims, 8 Drawing Sheets

Prior Art

SISO

FIG. 3A
Prior Art

SIMO

FIG. 3B
Prior Art

MISO

FIG. 3C
Prior Art

MIMO

NOISE ESTIMATION FILTER

BACKGROUND

Wireless mobile communication technology uses various standards and protocols to transmit data between a base transceiver station (BTS) and a wireless mobile device. Some wireless devices communicate using an orthogonal frequency-division multiplexing (OFDM) digital modulation scheme via a physical layer. OFDM standards and protocols can include the third generation partnership project (3GPP) long term evolution (LTE), the Institute of Electrical and Electronics Engineers (IEEE) 802.16 standard (e.g., 802.16e, 802.16m), which is commonly known to industry groups as WiMax (Worldwide interoperability for Microwave Access), and the IEEE 802.11 standard, which is commonly known to industry groups as WiFi. In LTE systems, the BTS can be a combination of evolved Node Bs (also commonly denoted as enhanced Node Bs, eNode Bs, or eNBs) and Radio Network Controllers (RNCs) in a Universal Terrestrial Radio Access Network (UTRAN), which communicates with the wireless mobile device, known as a user equipment (UE). Both the BTS and wireless mobile device can transmit and receive data. The transmitting station (Transmitter or Tx) can transmit data via a signal on a channel to a receiving station (Receiver or Rx), where a channel uses a specified frequency bandwidth. The transmitted signal on the channel from the transmitter can vary from the received signal at the receiver due to noise and interference. Estimating the effects of the channel in an OFDM signal can improve data transmission between wireless devices.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence. The term matrix and vector may be used interchangeably. A matrix (plural matrices) can be a rectangular array of numbers, symbols, or expressions. A vector (or vector space) can be a mathematical structure formed by a collection of vectors: objects that may be added together and multiplied ("scaled") by numbers, called scalars.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Figure 1:
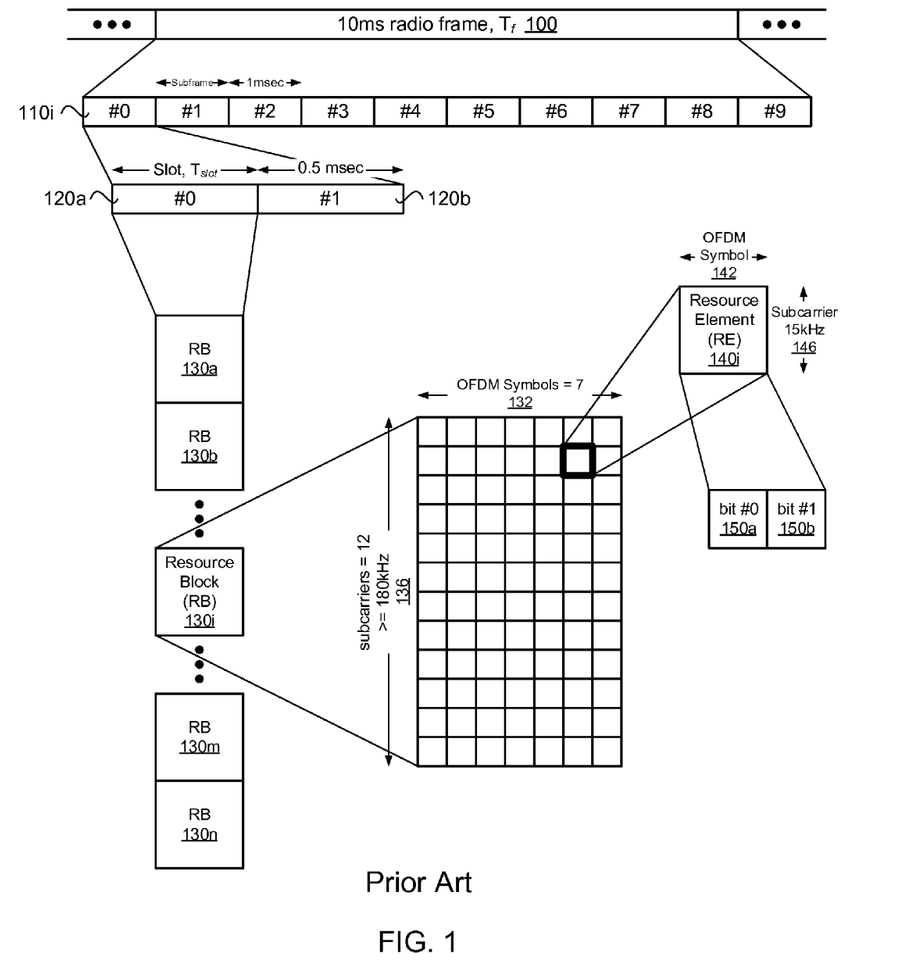
FIG. 1 illustrates a block diagram of radio frame resources in accordance with an example.

Data in wireless mobile communication can be transmitted on the physical (PHY) layer by the transmitting station (Transmitter or Tx) to the receiving station (Receiver or Rx) using a generic long term evolution (LTE) frame structure, as illustrated in FIG. 1. While a LTE frame structure is illustrated, a frame structure for an IEEE 802.16 standard (WiMax), an IEEE 802.11 standard (WiFi), or another type of communication standard using OFDM may also be used.

In the example illustrated in FIG. 1, a radio frame 100 of a signal used to transmit the data can be configured to have a duration, $T_f$, of 10 milliseconds (ms). Each radio frame can be segmented or divided into ten subframes 110*i* that are each 1 ms long. Each subframe can be further subdivided into two slots 120*a* and 120*b*, each with a duration, $T_{slot}$, of 0.5 ms. Each slot for a component carrier (CC) used by the transmitting station and the receiving station can include multiple resource blocks (RBs) 130*a*, 130*b*, 130*i*, 130*m*, and 130*n* based on the CC frequency bandwidth. Each RB 130*i* can include 12-15 kHz subcarriers 136 (on the frequency axis) and 6 or 7 orthogonal frequency-division multiplexing (OFDM) symbols 132 (on the time axis) per subcarrier. The RB can use seven OFDM symbols if a short or normal cyclic prefix is employed. The RB can use six OFDM symbols if an extended cyclic prefix is used. The resource block can be mapped to 84 resource elements (REs) 140*i* using short or normal cyclic prefixing, or the resource block can be mapped to 72 REs (not shown) using extended cyclic prefixing. The RE can be a unit of one OFDM symbol 142 by one subcarrier (i.e., 15 kHz) 146. Each RE can transmit two bits 150*a* and 150*b* of information in the case of quadrature phase-shift keying (QPSK) modulation. Other types of modulation may be used to transmit greater or fewer bits in each RE.

Figure 2A:
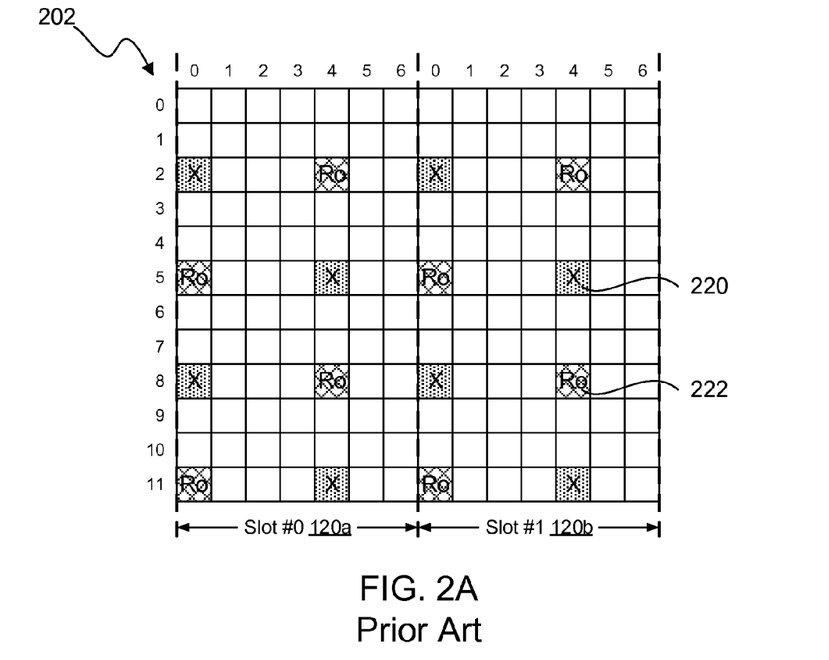
FIG. 2A illustrates a block diagram of reference (pilot) signals in Resource Blocks (RBs) in accordance with an example.
Figure 2B:
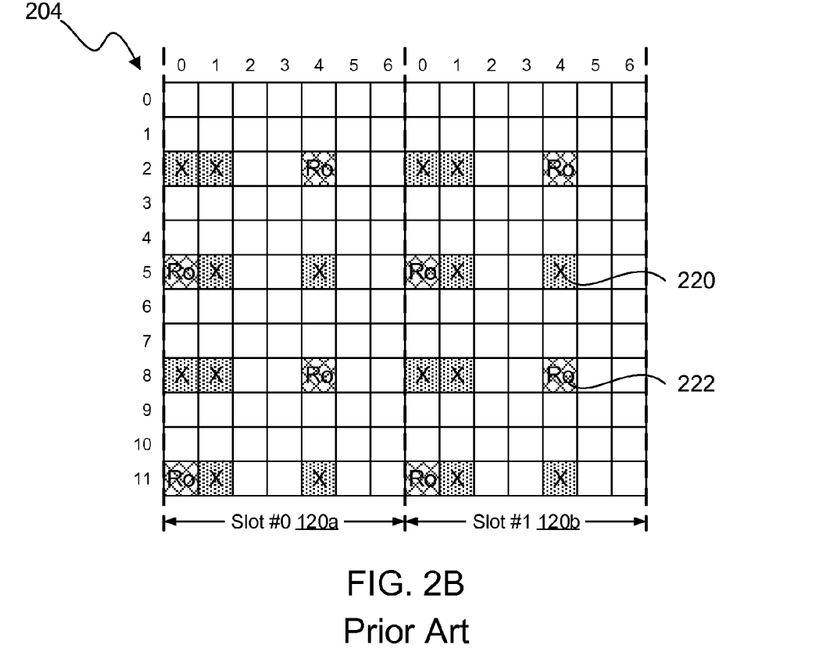
FIG. 2B illustrates a block diagram of reference (pilot) signals in a Resource Blocks (RBs) in accordance with an example.

Reference signals can be transmitted by OFDM symbols via resource elements in the resource blocks. Reference signals (or pilot signals or tones) can be a known signal used to estimate a channel and/or noise in the channel. As illustrated in FIG. 2A, a RB may include reference signal (RS) REs (reference signal OFDM symbols) 222 used for transmitting reference signals for a specific antenna port and unused REs (unused OFDM symbols) 220 not used for transmission on the specific port, which allow other antenna ports to transmit their reference signals. The number of reference signal REs and unused REs used in the RB can depend on the number of antenna ports. For example, a two antenna port configured RB 202 can include four reference signal REs ($R_0$) and four unused REs (X), as illustrated for a first antenna port in FIG. 2A. A four antenna port configured RB 204 can include four reference signal REs ($R_0$) and eight unused REs (X), as illustrated for a first antenna port in FIG. 2B.

Figure 3A:
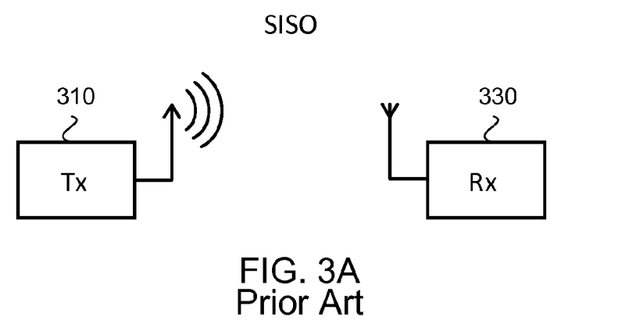
FIG. 3A illustrates a block diagram of a single-input single-output (SISO) wireless network in accordance with an example.
Figure 3B:
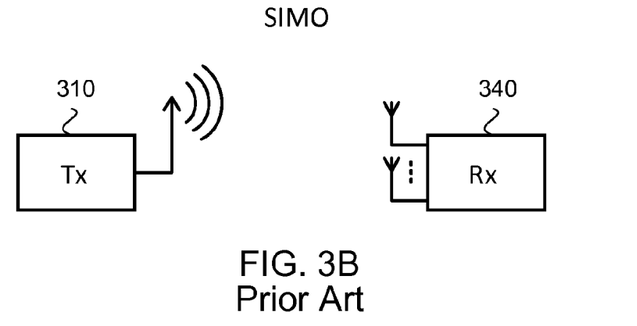
FIG. 3B illustrates a block diagram of a single-input multiple-output (SIMO) wireless network in accordance with an example.
Figure 3C:
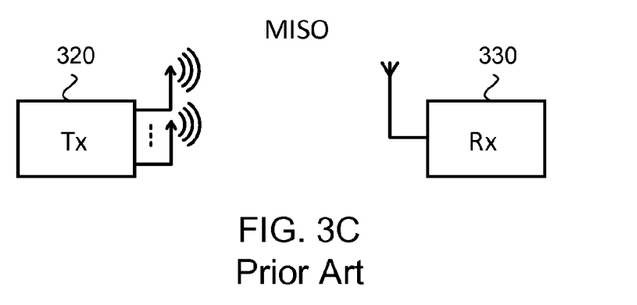
FIG. 3C illustrates a block diagram of a multiple-input single-output (MISO) wireless network in accordance with an example.
Figure 3D:
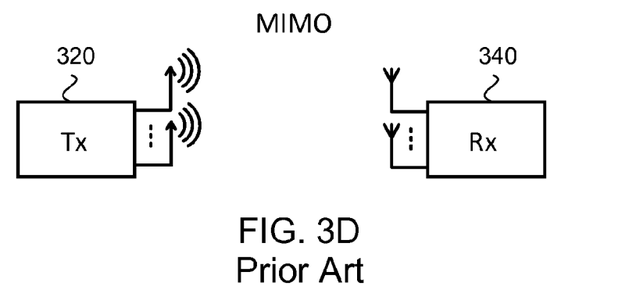
FIG. 3D illustrates a block diagram of a multiple-input multiple-output (MIMO) wireless network in accordance with an example.

FIG. 3A illustrates a wireless communication system using a single radio channel on a transmitting antenna port 310 and a single radio channel on receiving antenna port 330, which can be called a single-input single-output (SISO) wireless network. FIG. 3B illustrates a wireless communication system using a single radio channel 310 on a transmitting antenna port and multiple radio channels on a number of receiving antenna ports 340, which can be called a single-input multiple-output (SIMO) wireless network. FIG. 3C illustrates a wireless communication system using multiple radio channels on a number of transmitting antenna ports 320 and a single radio channel on a receiving antenna port 330, which can be called a single-input multiple-output (SIMO) wireless network. FIG. 3D illustrates a wireless communication system using multiple radio channels on a number of transmitting antenna ports 320 and multiple radio channels on a number of receiving antenna ports 340, which can be called a multiple-input multiple-output (MIMO) wireless network. The terms input and output typically refers to the radio channel carrying the signal, and not to the devices having antennas.

Figure 4:
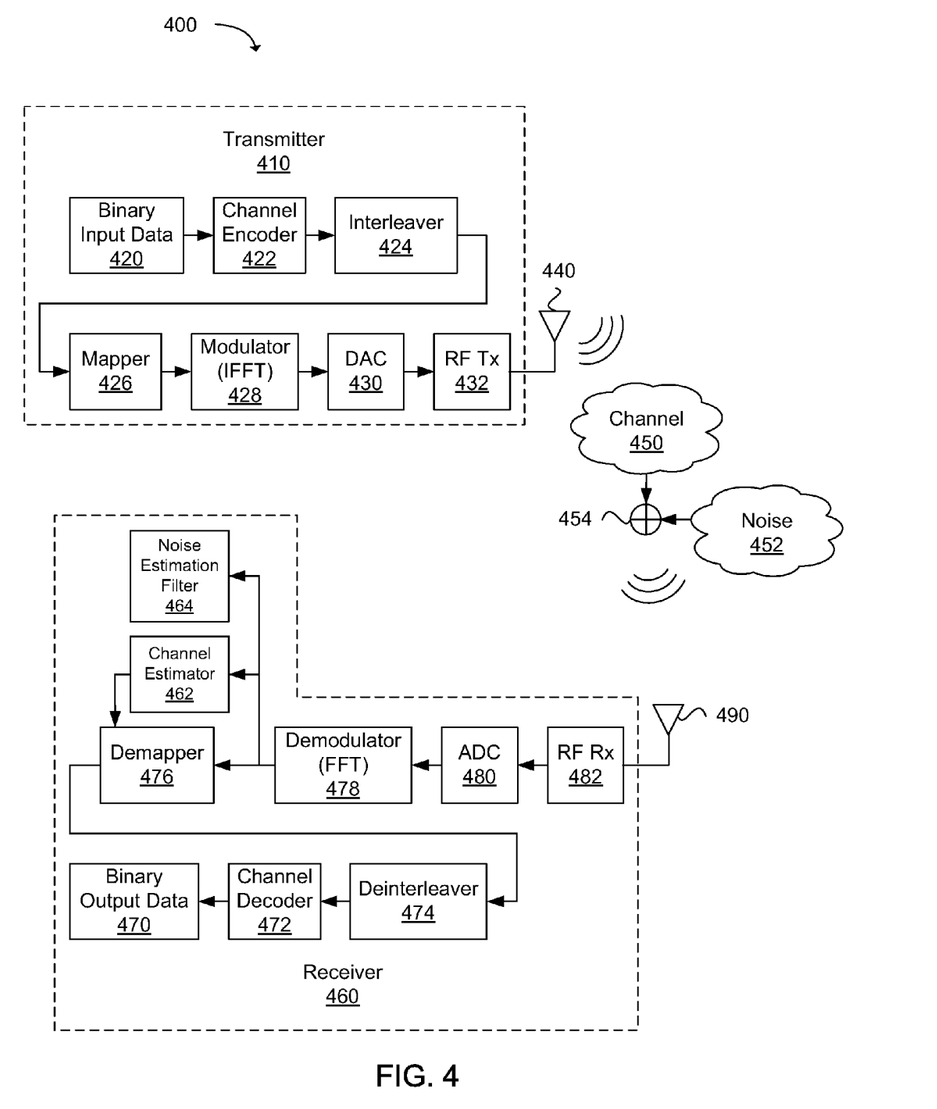
FIG. 4 illustrates a block diagram of the physical layer of a transmitter and receiver in an orthogonal frequency-division multiplexing (OFDM) wireless network with a noise estimation filter in accordance with an example.

A wireless communication system can be subdivided into various sections referred to as layers. In the LTE system, communication layers can include the physical (PHY), media access control (MAC), radio link control (RLC), packet data convergence protocol (PDCP), and radio resource control (RRC) layers. The physical layer can include the basic hardware transmission components of a wireless communication system 400, as illustrated in FIG. 4. For example, at the transmitter 410, binary input data 420 can be protected through encoding using a channel encoder 422, interleaved against fading phenomenon using an interleaver 424, and mapped to improve reliability using a mapper 426. The mapped data can be OFDM modulated into OFDM symbols using a modulator 428. The modulator can use an inverse fast Fourier transform (IFFT) algorithm to compute the inverse discrete Fourier transform (IDFT) to generate a modulated signal (vector x). The modulated signal can be converted to an analog signal with a digital-to-analog converter (DAC) 430. The analog signal can be transmitted via a radio frequency (RF) transmitter (Tx) 432 configured to send the signal to a transmitter antenna 440 operable to communicate the signal. The analog signal will follow a path referred to as a channel. The analog signal travelling through that path can be referred to as a channel 450 signal. The physical layer can include other components (not shown), such as series-to-parallel (S/P) converters, parallel-to-serial (P/S) converters, cyclic prefix (CP) inserters and deleters, guardband inserters and deleters.

The transmitted channel 450 signal can be subject to noise 452 and interference. The noise and interference is represented as an addition 454 to the channel signal, which can be received by a receiver antenna 490 and a radio frequency (RF) receiver (Rx) 482 at the receiver 460. The channel signal combined with the noise and interference can be converted to a digital modulated signal with an analog-to-digital converter (ADC) 480. The digital signal can be OFDM demodulated using a demodulator 478. The demodulator can use a fast Fourier transform (FFT) algorithm to compute the discrete Fourier transform (DFT) to generate a demodulated signal (vector y). A channel estimator 462 and/or noise estimation filter 464 can use the demodulated signal to estimate the noise and interference that occurs in the channel 450 and provide noise estimation, respectively. The demodulated signal can be demapped using a demapper 476, deinterleaved using a deinterleaver 474, and decoded by a channel decoder 472 to generate binary output data 470 that can be used by other layers of the receiving station.

The channel estimator 462 may be used to estimate the original channel in an OFDM transmission. The noise estimation filter 464 can be used to estimate the noise level of noise associated with an OFDM channel. The estimated noise level can be used as an input for a channel quality indicator (CQI) report, a precoding matrix indicator (PMI) report, a transmission rank indicator (RI) report, and other feedback reports. The estimated noise level can also be used in interference mitigation and spatial whitening of the OFDM signal.

Figure 5:
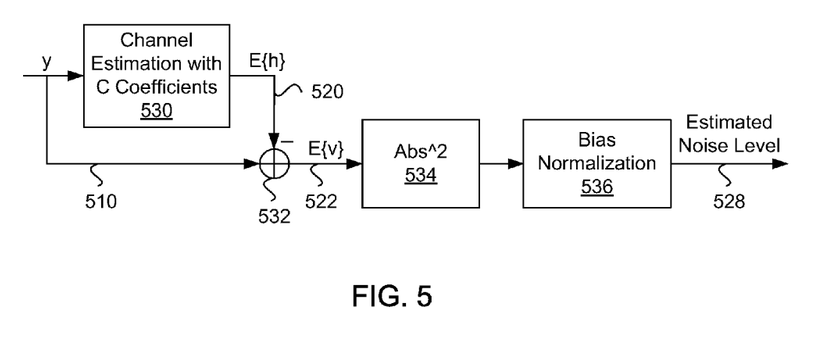
FIG. 5 illustrates a process of generating an estimated noise level using a channel estimator in accordance with an example.

In channel estimation, as illustrated in FIG. 5, channel conditions can be represented by the reference signal vector y 510, which can be a channel coefficient vector h added to a noise vector v. Reference signal vector y can be comprised of a plurality of reference signals, such as the R0 illustrated in FIGS. 2A and 2B. An estimated channel coefficient vector E{h} 520 can be generated by multiplying the reference signal vector y by a channel estimation matrix with C coefficients 530. An estimated noise vector E{v} 522 can be generated by subtracting the estimated channel coefficient vector E{h} from the reference signal vector y. The square of the absolute value 534 of the estimated noise vector E{v} can be normalized with bias using bias normalization 536 to generate an estimated noise level 528.

Channel and noise estimation using a channel estimator can have a significant signal "leakage" into the noise estimate, thus in high signal-to-interference and noise ratio (SINR) conditions, the estimate from the channel estimator described in FIG. 5 can be inaccurate. A dedicated filter for noise estimation, independent from the channel estimator can provide a mechanism for generating an estimated noise level that may not be dependent on the channel estimate. Channel estimation can be optimized for channel performance, not necessarily noise estimation performance, so an optimized channel performance may generate distortion in the estimation of noise. A dedicated noise estimation filter can assist in generating a more accurate noise signal for use in CQI/PMI/RI reports based on cell-specific reference signals in the whole subframe, where channel estimation for demodulation may be based on cell-specific or user-specific reference signals and may be applied in parts of the subframe.

Figure 6:
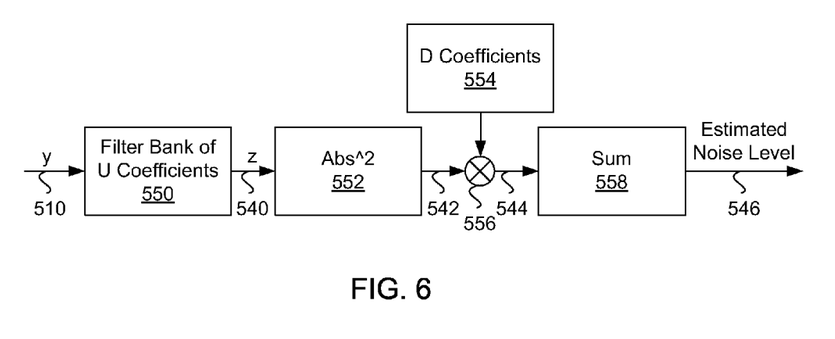
FIG. 6 illustrates a process of generating an estimated noise level using a noise estimation filter in accordance with an example.

An OFDM system can be equivalent to a transmission of data over a set of parallel channels. As a result, the fading channel of an OFDM system can be viewed as a two dimensional lattice in a time-frequency plane. FIG. 6 illustrates a noise estimation filter which can be a normalized filter (unbiased) with minimal distortion (after normalization) and minimal relative variance of two dimensional (2D) noise estimation over the time and frequency plane. The noise estimation filter can provide better noise estimation performance in cases with a small number of symbols and/or signals with a high signal-to-noise ratio (SNR). The noise estimation filter can generate a vector z 540, which can be a "diagonalization" of a reference signal vector y 510, by multiplying the reference signal vector y by a filter bank of U coefficients 550 (pre-computed vector coefficients). The U coefficients will be discussed in greater detail in the discussion that follows.

The filter bank of U coefficients 550 can multiply a unitary vector by the reference signal vector y to generate scalar products (vector z) 540 of the reference signal vector y. Single estimates 542 of the scalar products can be generated by taking the square of the absolute values 552 of the scalar products of the vector z. The single estimates can be multiplied 556 by D coefficients 554 (pre-computed combining coefficients) to generate multiple weighted single estimates 544. The D coefficients will be discussed in greater detail in the discussion that follows. The weighted single estimates can be summed 558 together to obtain an estimate for the interference and noise power 546.

The reference signal vector y 510 can be a vector of reference signals with a length of n numbers of reference signals, wherein n is a positive integer. The unitary vector and D coefficients can be pre-computed (computed prior to the reception of the reference signal vector y). The filter bank of U coefficients or unitary vector can be an Eigen vector matrix of a channel covariance matrix. The channel covariance matrix can be based on a generalized channel model, channel statistics, and/or other assumptions. The channel statistics can be generated based on long-term statistics, so a recalculation of the unitary vector and D coefficients occurs infrequently. The D coefficients can be optimized by generating normalized combining coefficients that can minimize the sum of distortion (bias) caused by the signal and variance of the estimator. In one embodiment, Lagrange multipliers can be used to optimize the D coefficients. The D coefficients can be noise coefficients, which can be a positive constant represented by $$\frac{\lambda - \frac{1}{\delta^2} d_{hh,i}}{2\frac{1}{\delta^4}(d_{hh,i} + \delta^2)^2}$$ [Expression 1]

when $$\lambda \geq \frac{1}{\delta^2} d_{hh,i},$$

otherwise the noise coefficient can have a zero value.

In Expression 1, the variable i represents a reference signal 1 to n where n is a positive integer, $\lambda$ is a Lagrange multiplier, $d_{hh,i}$ is an Eigenvalue of a channel covariance matrix $\Lambda_{hh}$, and $\delta^2$ is the variance of the noise. A sum of the plurality of noise coefficients can have a value of one to provide a plurality of normalized noise coefficients. The Lagrange multiplier $\lambda$ can have a value $$\frac{1}{\delta^2} d_{hh,j} \geq \lambda \geq \frac{1}{\delta^2} d_{hh,k},$$

where $d_{hh,j}$ and $d_{hh,k}$ each represent at least one Eigenvalue for the channel covariance matrix where j and k are positive integers in the set 1 to n.

Mathematically, a D coefficient $\tilde{d}_i$ can be represented by $$\tilde{d}_i = \frac{\lambda - \frac{1}{\delta^2} d_{hh,i}}{2\frac{1}{\delta^4}(d_{hh,i} + \delta^2)^2},$$ [Expression 2]

where $d_i = \tilde{d}_i$ for $\tilde{d}_i > 0$, $d_i = 0$ for $\tilde{d}_i \leq 0$, and $$\sum_i d_i = 1.$$

Figure 7:
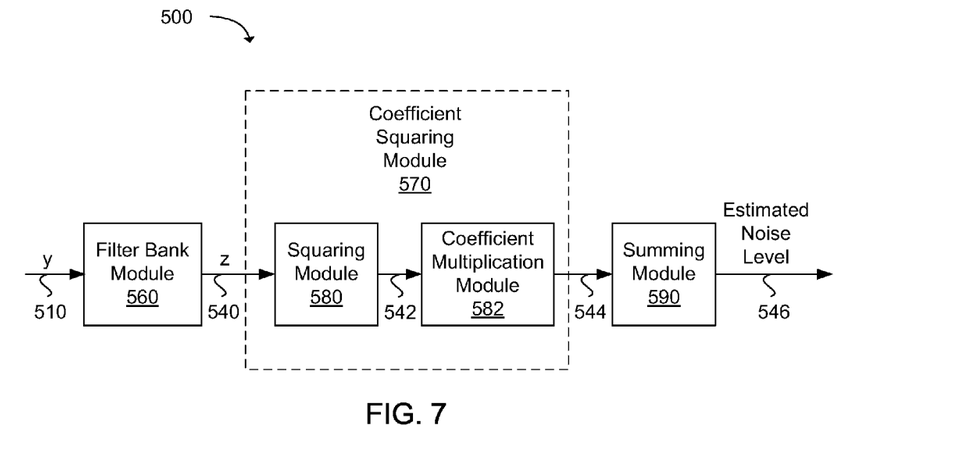
FIG. 7 illustrates a block diagram of a noise estimation filter with a filter bank module, a coefficient squaring module, and a summing module where a squaring module is positioned before a coefficient multiplication module in the coefficient squaring module in accordance with an example.

FIG. 7 illustrates another example of a noise estimation filter 500. The noise estimation filter can include a filter bank module 560, a coefficient squaring module 570, and a summing module 590. The filter bank module can multiply the reference signal vector y 510 by a filter bank of U coefficients to generate a vector z 540. The coefficient squaring module can include a squaring module 580 and a coefficient multiplication module 582, where the vector z can be an input to the squaring module, which generates single estimates 542 by squaring the scalar products of the vector z. The single estimates can provide an input to the coefficient multiplication module 582, which generates multiple weighted single estimates 544 by multiplying the singles estimates by D coefficients. The summing module can add the weighted single estimates together to obtain an estimate for the interference and noise power 546.

A strong reference signal can be assumed to have little or no noise contribution to the received channel, which corresponds to the y vector. The strong reference signal can have a noise coefficient with a value of substantially zero. The coefficient multiplication module 582 can store a plurality of noise coefficients and at least one of the plurality of noise coefficients may have a value of zero. The sum of the plurality of noise coefficients stored in the coefficient multiplication module can have a value of one to provide a plurality of normalized noise coefficients.

Figure 8:
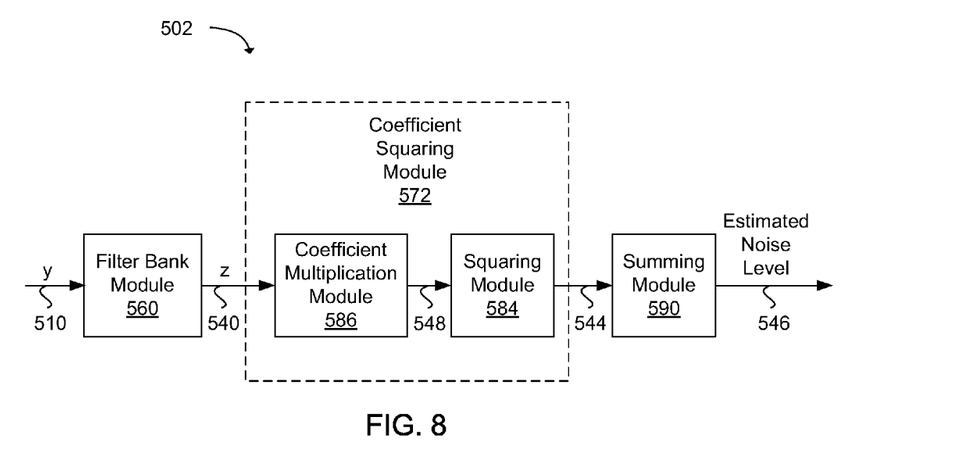
FIG. 8 illustrates a block diagram of a noise estimation filter with a filter bank module, a coefficient squaring module, and a summing module where a coefficient multiplication module is positioned before a squaring module in the coefficient squaring module in accordance with an example.

FIG. 8 illustrates another example of a noise estimation filter 502, where the noise estimation filter can include a filter bank module 560, a coefficient squaring module 572, and a summing module 590, similar to the noise estimation filter 500 in FIG. 7. The coefficient squaring module in FIG. 8 reverses the order of a squaring module 584 and a coefficient multiplication module 586, where the vector z 540 can be an input to the coefficient multiplication module 586, which generates a weighted scalar product vector 548 by multiplying (or weighting) positive square roots of the D coefficients by the vector z. The weighted scalar product vector can provide an input to the squaring module 584, which generates multiple weighted single estimates 544 by squaring the weighted scalar product vector 548. The order of the squaring module and the coefficient multiplication module in the coefficient squaring module does not matter as long as the D coefficients are adjusted due to the change in the order of the modules.

In another example (not shown), after the filter banks coefficients (U coefficients) and noise coefficients (D coefficients) are pre-calculated (before receiving a reference signal), a matrix A can be constructed where A=U·D·U*, where ( )* is a conjugate transpose of the vector. The noise estimation can then be generated by $\delta^2$ where $\delta^2 = y^* \cdot A \cdot y$.

Figure 9:
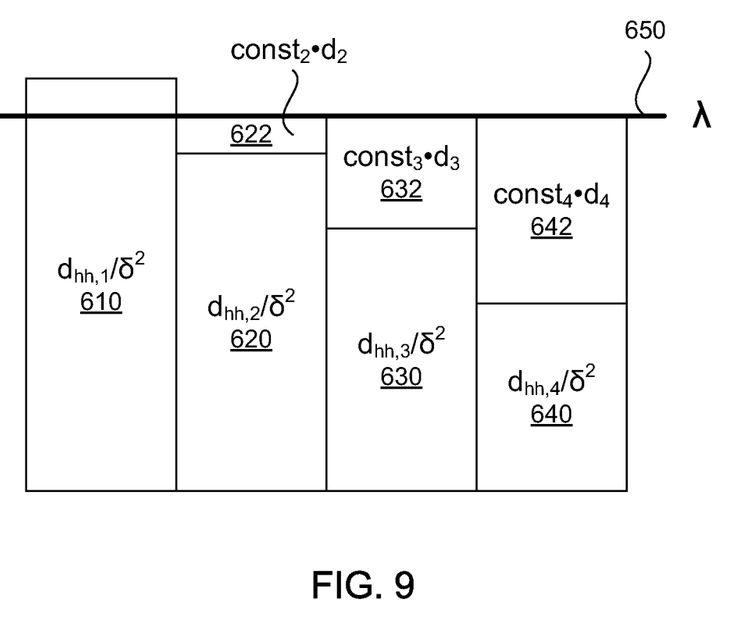
FIG. 9 illustrates a diagram representative of water-pouring with Lagrange multipliers in accordance with an example.

In one embodiment, the D coefficients can be determined using a "water-pouring" method, as illustrated in FIG. 9. The water level can be a Lagrange multiplier constant $\lambda$ 650, where a water fill level 622, 632, and 642 for a reference signal has a positive value when a floor value 610, 620, 630, and 640 for the reference signal is less than the water level $\lambda$ and the sum of each water fill level does not exceed a value of one (or a total "power" of the estimated power level). Otherwise, the water fill level can have a zero value. The floor value for the reference signal can be a constant $$\frac{d_{hh,i}}{\delta^2},$$

where i represents reference signal 1 to n where n is a positive integer, $d_{hh,i}$ is an Eigenvalue of a channel covariance matrix $\Lambda_{hh}$, and $\delta^2$ is the variance of the noise. The total "power" of the estimated power level is limited by a value of one. The water fill level is a $const_i \cdot d_i$, where $$const_i = 2 \frac{1}{\delta^4}(d_{hh,i} + \delta^2)^2,$$

i represents a reference signal 1 to n, where n is a positive integer, $d_{hh,i}$ is an Eigenvalue of a channel covariance matrix $\Lambda_{hh}$, and $\delta^2$ is the variance of the noise. The value $d_i$ can be determined. The value of $d_i$ can be proportional to the constant floor value $$\frac{d_{hh,i}}{\delta^2}.$$

Figure 10:
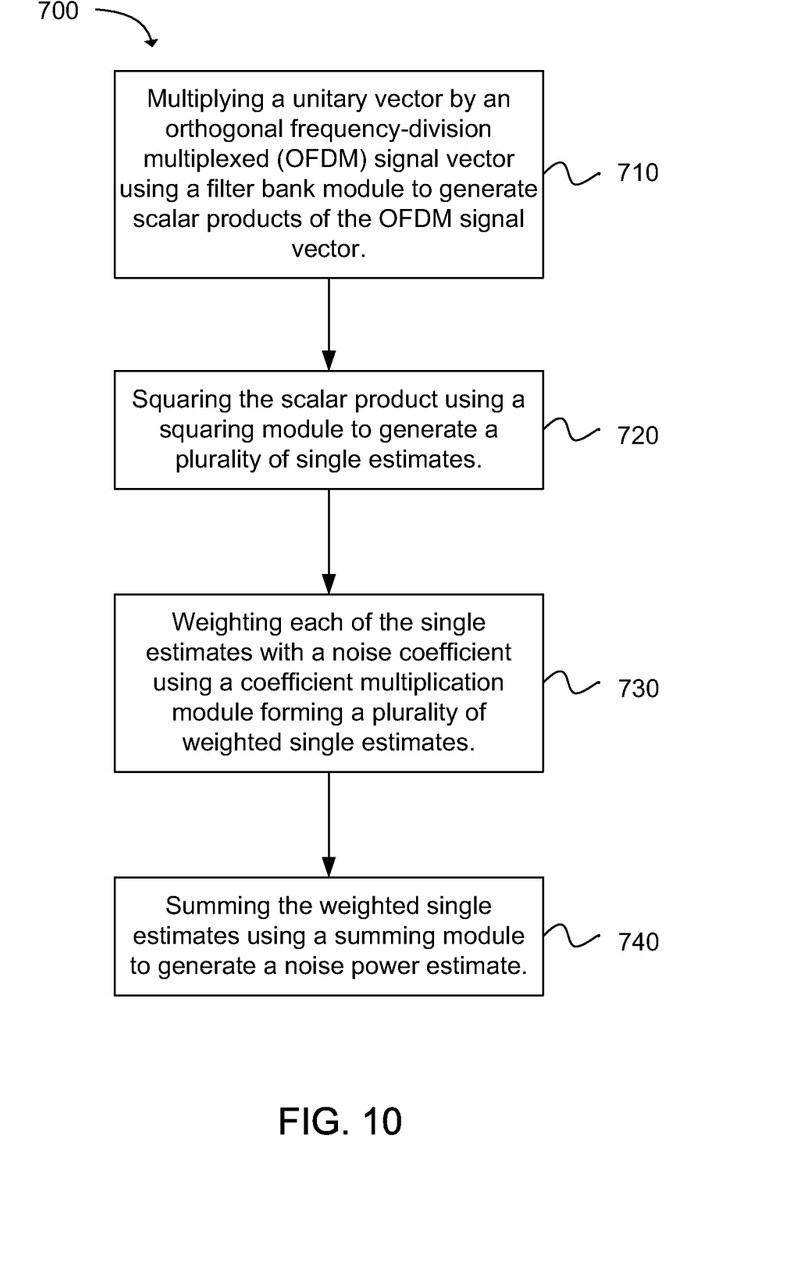
FIG. 10 depicts a flow chart of a method for estimating noise in an orthogonal frequency-division multiplexed (OFDM) signal in accordance with an example.

Another example provides a method 700 for estimating noise in an orthogonal frequency-division multiplexed (OFDM) signal, as shown in the flow chart in FIG. 10. The method includes the operation of multiplying a unitary vector by an OFDM signal vector using a filter bank module to generate scalar products of the OFDM signal vector, as in block 710. The operation of squaring the scalar product using a squaring module to generate a plurality of single estimates follows, as in block 720. The next operation of the method can be weighting each of the single estimates with a noise coefficient using a coefficient multiplication module forming a plurality of weighted single estimates, as in block 730. The method further includes summing the weighted single estimates using a summing module to generate a noise power estimate, as in block 740.

The noise estimation filter and the method for estimating noise in an orthogonal frequency-division multiplexed (OFDM) signal can be used in a SISO wireless network (one transmitter antenna transmits each pilot tone or reference signal that can be received by one receiver antenna). A similar approach can be used for a SIMO wireless network (the pilot pattern or reference signal pattern transmitted from one transmitter antenna and received by at least two receiver antennas) or a MIMO wireless network (the pilot pattern or reference signal pattern transmitted from at least two transmitter antennas and received by at least two receiver antennas), where a quadratic estimator and a conjugate module is used. The noise estimation filter can be included in link adaption, interference mitigation, and/or a digital demodulator.

The noise estimation filter can provide noise estimation over a modulated signal and can provide a distinction between the noise and the modulated signal, after passing through an unknown channel. The estimation of noise can be based on Principal Component Analysis (PCA) of the reference (pilot) signal (i.e. decomposition of the signal into orthogonal components). A few PCA components can be used where the signal is weakest to estimate the noise and/or interference. The noise estimation filter and associated method can provide for a selection of combining of PCA components for a noise and/or interference estimation.

The noise estimation filter can use a quadratic estimator for noise and/or interference. Before a measurement time (a time at which reference signals are received), PCA components can be pre-computed as the Eigenvectors of an a priori channel covariance matrix at the reference signals locations. For each PCA component, a weight coefficient can also be pre-computed. A PCA component with non-zero weight can be referred to as a "noise filter" or simply a "filter". The strong signal components may get zero coefficients. Thus strong signal components can be excluded from the noise estimation. The rest of the filters with a non-zero coefficient can form "the bank of noise filters."

In the measurement time (when pilot signals are received), the method for estimating noise in an orthogonal frequency-division multiplexed (OFDM) signal can include the following stages. First, computing scalar products of the reference signal with all of the filters from the bank. Then, calculating "single estimates", equal to the square of absolute values of the scalar products. And then, weighting the "single estimates" with pre-computed combining coefficients and summing the weighted "single estimates" together. Thus, an estimate for the interference plus noise power can be obtained.

The following discussion provides more details or term definitions and how the coefficients can be computed on the basis of an a priori channel covariance matrix (at pilot locations) $\Lambda_{hh}$, and on variance $\delta^2$, which can be a ratio of thermal noise to the signal power.

n is a number of reference signals being used for the estimation.

y is the reference signal vector.

$\Lambda_{hh} = E[HH^*]$ is an a priori channel covariance matrix at the reference symbols (RS) locations in the reference signal vector.

$d_{hh,i}$ for i=1, ..., n is comprised of Eigenvalues of $\Lambda_{hh}$.

$a_i$ for i=1, ..., n is comprised of Eigenvectors of $\Lambda_{hh}$ (the noise filters).

$d_i$ for i=1, ..., n is comprised of combining coefficients.

Noise estimation coefficients can be derived using a generalized form of the noise estimation. The received pilots (or reference signals) can be represented by Equation 1, where h is a channel coefficient vector and v is a noise vector.

$$\underline{y} = \underline{y} + \underline{v} \qquad \text{[Equation 1]}$$

A noise amplitude estimate can be represented by Equation 2, where $\hat{v}$ is a vector of length N filters, y is a vector of length N pilots, and $\tilde{C}$ is the noise estimation filters matrix of size N filters×N pilots. The noise estimation filters matrix $\tilde{C}$ can be equivalent to (I-C)/Bias in a channel estimator (FIG. 5), where I is an identity matrix and C is a channel estimation matrix.

$$\underline{\hat{v}} = \tilde{C}\underline{y} \quad [\text{Equation 2}]$$

A normalized noise estimate can be represented by Equation 3.

$$\hat{\sigma}^2 = \underline{\hat{v}}^* \cdot \underline{\hat{v}} = \underline{y}^* \tilde{C}^* \tilde{C} \underline{y} \quad [\text{Equation 3}]$$

The conjugate transpose of the noise estimation filters matrix $\tilde{C}^*$ and the noise estimation filters matrix $\tilde{C}$ can be represented by $A = \tilde{C}^* \tilde{C}$. For this example, the noise estimation filter matrix can be the square root of A. Equivalently, the estimation can be represented by Equation 4.

$$\hat{\sigma}^2 = \underline{y}^* A \underline{y} \quad [\text{Equation 4}]$$

To produce a real and positive estimation $\hat{\sigma}^2$, the matrix A may be a positive (non-negative) definite matrix (i.e., the matrix A can be conjugate symmetric [Hermitian matrix]). The matrix may be a negative definite matrix A if the negative definite matrix can produce a useable solution.

The matrix A can be optimized. The size of A can be N pilots×N pilots, and the number of filters can be interpreted as the rank of A≤N pilots. The advantage of optimizing A instead of optimizing $\tilde{C}$, can be that the number of filters can be implicit in the optimization. The following equivalence can exist:

$\min_{A \in positive\ definite\ matrices}$ optimization criterion(A)

$\Updownarrow$ $\min_{1 \leq Nfilters \leq Npilots} \min_{\tilde{C}}$ optimization criterion($\tilde{C}$)

Thus, the optimization using A can be simpler and can optimize fewer parameters (matrix coefficients) than a full optimization using $\tilde{C}$.

The quadratic form of the estimator y*Ay may not be optimal in general (for example, in the sense of maximum likelihood), but the estimator y*Ay may be optimal for quadratic criterion (like minimum mean square error).

In the following, the Gaussian probability distribution for the channel h and the noise v (where the channel and noise are independent) can be assumed, which can be represented by Equations 5, 6, and 7.

$$\underline{h} \sim N(0, \Lambda_{hh}) \quad [\text{Equation 5}]$$

$$\underline{v} \sim N(0, \sigma^2 I) \quad [\text{Equation 6}]$$

$$\underline{y} = \underline{h} + \underline{v} \sim N(0, \Lambda_{hh} + \sigma^2 I) \quad [\text{Equation 7}]$$

The assumption can be for a SISO wireless network, where the vector can be over pilot location in time and frequency.

For bias normalization, the received pilots vector y can be assumed with no channel (i.e, y=v, y can be equal to the noise only, white noise with variance $\sigma^2$). The noise estimation can be represented by Equation 8, where the trace (i.e., trace (A)) of an n-by-n square matrix A can be defined to be the sum of the elements on the main diagonal (the diagonal from the upper left to the lower right).

$$E\{\hat{\sigma}^2\} = E\{\text{trace}(v^*Av)\} = E\{\text{trace}(vv^*A)\} = \text{trace}(E\{v \underline{v}^*\} \cdot A) = \text{trace}(\sigma^2 I \cdot A) = \sigma^2 \cdot \text{trace}(A) \Rightarrow \text{trace}(A) = 1 \quad [\text{Equation 8}]$$

In a complementary way, the distortion expression can be derived assuming no noise and the received pilots vector y equal to the channel only (i.e., y=h). The channel can be considered in time and frequency domain, in the relevant pilot locations. The distortion function can be the expected channel response after the estimation process. The distortion function can be defined by Equation 9.

$$D(A) = E\{h^*Ah\} = E\{\text{trace}(A \cdot hh^*)\} = \text{trace}(A \cdot E\{\underline{h} \underline{h}^*\}) = \text{trace}(A \cdot \Lambda_{hh}) \quad [\text{Equation 9}]$$

For a signal comprised of channel plus noise (Equation 1 or y=h+v), using a normalized estimation matrix A can generate Equation 10, where SNR is the signal-to-noise ratio.

$$\frac{E\{\hat{\sigma}^2\}}{\sigma^2} = 1 + SNR \cdot D(A) \quad [\text{Equation 10}]$$

The variance of the estimator can receive a contribution from the variance of both the noise and the channel as represented by combining Equation 1 and Equation 4 to generate Equation 11. Equation 12 can be generated by applying a variance function to Equation 4.

$$\hat{\sigma}^2 = \underline{y}^* A \underline{y} = (\underline{h}^* + \underline{v}^*) A (\underline{h} + \underline{v}) \quad [\text{Equation 11}]$$

$$VAR(\hat{\sigma}^2) = VAR(\underline{y}^* A \underline{y}) \quad [\text{Equation 12}]$$

To get relative variance, Equation 11 can be normalized by $$\frac{1}{\sigma^4}.$$

Since the elements of y may be correlated, getting a simple expression for the variance in the general case may be difficult.

So the optimization criterion can be defined as: finding positive definite matrix A, which brings the average distortion and relative variance to minimum, which can be represented by Equation 13, subject to bias normalization (i.e., Equation 8 or trace(A)=1) where $\alpha$ is a weighting factor, which controls the ratio between the relative variance and the distortion.

$$F(A) = \frac{VAR(\hat{\sigma}^2)}{\sigma^4} + \alpha \cdot D(A) \to \min \quad [\text{Equation 13}]$$

Different values for $\alpha$ can be selected to get different targets for optimization. The factor $\alpha$ can be a factor of the SNR and the number of pilots (Npilots), with the notation $\alpha$(SNR, $N_{pilots}$). A possible selection of the factor $\alpha$ can be simply $$\alpha = \frac{1}{\sigma^2}$$

or $\alpha$=SNR, which can be compliant with the normalization of the distortion.

The criterion used to select the factor $\alpha$ can be equivalent to minimum mean square error criterion.

In high SNR scenarios, the distortion can be more dominant so the factor $\alpha$ may be a larger value. On the other end, in low SNR scenarios, the relative variance can be more dominant, so the factor $\alpha$ may be small. The noise estimation filter can provide a good noise estimation for both high and low SNR scenarios by providing optimization for different SNR ranges using the weighting factor $\alpha$.

The estimation matrix A can be designed for different number of pilots (different number of symbols). The estimation matrix A can be designed for a worst case of the smallest number of pilots (i.e., Partially Used Sub-Carrier [PUSC or Partially Used Sub-Channel] 1 cluster×2 symbols). When the number of pilots increases then the number of computations can grow quadratically. Solutions for the growing computations can be: First, if the rank of A is much smaller then Npilots, then matrix A can be decomposed into Nfilters (=rank of A) filters and use the Nfilters filters. Second, the biggest Nfilters Eigen-values of A can be used. Third, the optimized matrix A for a small number of pilots can be duplicated to get a block diagonal matrix A.

Taking the expected covariance matrix of the channel response $\Lambda_{hh}$ which can be represented by Equation 14.

$$\Lambda_{hh} = E\{\underline{h}\underline{h}^*\} \quad \text{[Equation 14]}$$

As a positive definite matrix, matrix A is decomposed into Eigen vectors and Eigen values as represented by Equation 15 and Equation 16, where U is an Eigen vectors matrix, which is unitary with orthonormal columns, and $D_{hh}$ is the Eigen values diagonal matrix.

$$\Lambda_{hh} = U \cdot D \cdot U^* \quad \text{[Equation 15]}$$

$$D_{hh} = U^* \cdot \Lambda_{hh} \cdot U \quad \text{[Equation 16]}$$

The matrix A used previously (e.g., in Equation 4) can be built with the same Eigen vectors as $\Lambda_{hh}$, represented by Equation 17.

$$A = U \cdot D \cdot U^* \quad \text{[Equation 17]}$$

Thus, selecting a diagonal non-negative matrix D, a non-negative definite matrix A is generated. The square root of A is represented by Equation 18, so the i-th estimation filter equals $u_i \sqrt{d_i}$, where $u_i$ is the i-th column of U, and $d_i$ is the i-th diagonal element of D.

$$\sqrt{A} = U \cdot \sqrt{D} \quad \text{[Equation 18]}$$

An explanation of the solution can be as follows: Define a new vector z, which can the "diagonalization" of vector y, where vector z is represented by $\underline{z} \triangleq U^* \underline{y}$. The samples of z can be uncorrelated variables (and independent in the Gaussian case). Applying an Eigen vector for vector y and vector z can be represented by Equation 19 and Equation 20, respectively.

$$\Lambda_{yy} = U \cdot D_{yy} \cdot U^* = U \cdot (D_{hh} + \sigma^2 I) \cdot U^* \quad \text{[Equation 19]}$$

$$\Lambda_{zz} = E\{\underline{z}^*\underline{z}\} = D_{yy} = D_{hh} + \sigma^2 I \quad \text{[Equation 20]}$$

Then, squaring the samples without filtering (diagonal A, which is the square root of D) can provide a solution.

In general form, the matrix B is defined as $B \triangleq U^*AU$, which can be the estimation matrix for vector z. Matrix B can be split into diagonal matrix D and the non-diagonal elements in matrix C (matrix C includes cross terms only, and the diagonal can be zero). As shown later, the matrix C may be equal to zero. The variance of the estimator for vector y and vector z can be represented by Equation 21 and Equation 22, respectively.

$$\hat{\sigma}^2 = \underline{y}^* A \underline{y} = \underline{y}^* U U^* A U U^* \underline{y} = \underline{z}^* \cdot (U^*AU) \cdot \underline{z} \triangleq \underline{z}^* B \underline{z} \quad \text{[Equation 21]}$$

$$\hat{\sigma}^2 = \underline{z}^* B \underline{z} = \underline{z}^* C \underline{z} + \underline{z}^* D \underline{z} \quad \text{[Equation 22]}$$

An optimization constraint can be for non-negative matrix A, represented by Equation 23, where universal quantifier $\forall$ can mean "for all values of x in the domain". Another optimization constraint can be for bias normalization, represented by Equation 24.

$$\forall_k \ d_k \geq 0 \quad \text{[Equation 23]}$$

$$\text{trace}(A) = 1 \Rightarrow \sum_{1 \leq k \leq Npilots} d_k = 1 \quad \text{[Equation 24]}$$

For calculation of the distortion, the expectation of the estimator (Equation 8) is used with optimization constraints to generate Equation 25, so the distortion is calculated using Equation 9, provided above, to be Equation 26. The non-diagonal values in matrix C may not contribute to the expectation (the expectation of zCz can be zero).

$$E\{\hat{\sigma}^2\} = \quad \text{[Equation 25]}$$
$$E\{\underline{z}^* D \underline{z}\} = \sum_i E\{|z_i|^2\} \cdot d_i = \text{trace}(D_{hh} \cdot D) + \sigma^2 \cdot \text{trace}(D)$$

$$D(A) = \text{trace}(D_{hh} \cdot D) = \sum_i d_i \cdot d_{hh,i} \quad \text{[Equation 26]}$$

When calculating the variance, the part zDz can be uncorrelated to the part zCz and hence the total variance can be the sum of the variances of the two parts. Since the variance can be non-negative, then the variance of part zCz can enlarge the total variance, as represented by Equation 27. Thus, when minimizing the variance, matrix C may be omitted (with a value of zero), since matrix C may enlarge the variance and may not contribute to the expectation, as represented by Equation 28 (derived from Equation 12).

$$\text{VAR}\{\hat{\sigma}^2\} = \text{VAR}\{\underline{z}^* C \underline{z}\} + \text{VAR}\{\underline{z}^* D \underline{z}\} \geq \text{VAR}\{\underline{z}^* D \underline{z}\} \quad \text{[Equation 27]}$$

$$\text{VAR}\{\underline{z}^* D \underline{z}\} = \text{VAR}\left\{\sum_i |z_i|^2 \cdot d_i\right\} = \quad \text{[Equation 28]}$$
$$\sum_i |d_i|^2 \cdot \text{VAR}\{|z_i|^2\} = \sum_i |d_i|^2 \cdot (d_{hh,i} + \sigma^2)^2$$

So the total optimization function in term of the matrix D is represented by Equation 29, when $\alpha$ is taken to be $$\frac{1}{\sigma^2}$$

and where s.t. can mean "such that" (or "so that").

$$F(D) = \quad \text{[Equation 29]}$$
$$\frac{1}{\sigma^2} \text{trace}(D_{hh} \cdot D) + \frac{1}{\sigma^4} \sum_i |d_i|^2 \cdot (d_{hh,i} + \sigma^2)^2 \to \min$$
$$\text{s.t. } \text{trace}(D) = 1$$

The total optimization function is optimized for variance and distortion. Optimizing for variance, the matrix D is represented by $$D = I \cdot \frac{1}{N_{pilots}}.$$

Optimizing for distortion, the matrix D is represented by $$D = \begin{bmatrix} 1 & 0 \\ 0 & 0 \end{bmatrix},$$

where 0 is a zero matrix, and the 1 corresponds to the location of the smallest Eigen value in $D_{hh}$.

A solution using both variance and distortion can depend on the ratio between the optimization criteria, which can be suited for different SNR values.

Lagrange multipliers is used to optimize the function represented by Equation 29, which can generate Equation 30.

$$F(D) = \frac{1}{\sigma^2}\text{trace}(D_{hh} \cdot D) + \frac{1}{\sigma^2}\sum_i |d_i|^2 \cdot \quad \text{[Equation 30]}$$
$$(d_{hh,i} + \sigma^2)^2 - \lambda \cdot \text{trace}(D)$$
$$= \sum_i d_i \cdot \left(\frac{1}{\sigma^2}d_{hh,i} - \lambda\right) + d_i^2 \cdot \frac{1}{\sigma^4}(d_{hh,i} + \sigma^2)^2$$

Taking a derivative of the function in Equation 30 and comparing the derivative to zero is used to generate a noise coefficient that can be used in a noise estimation filter, represented by Equation 31. Equation 31 can be similar to Expression 1 and Expression 2 provided above.

$$\frac{\partial F(D)}{\partial d_i} = \left(\frac{1}{\sigma^2}d_{hh,i} - \lambda\right) + 2d_i \cdot \frac{1}{\sigma^4}(d_{hh,i} + \sigma^2)^2 = 0 \quad \text{[Equation 31]}$$

$$\Rightarrow \begin{cases} d_i = \dfrac{\lambda - \frac{1}{\sigma^2}d_{hh,i}}{2 \cdot \frac{1}{\sigma^4}(d_{hh,i} + \sigma^2)^2} \geq 0 \\ \text{else } d_i = 0 \\ \text{s.t. } \sum_i d_i = 1 \end{cases}$$

The noise estimation filters (shown in FIGS. 6-8) can provide better noise estimation performance in cases with a small number of symbols and/or signals with a high signal-to-noise ratio (SNR). The noise estimation filter can generate a vector z 540, which can be a "diagonalization" of a reference signal vector y 510, by multiplying the reference signal vector y by a filter bank of U coefficients 550 (pre-computed vector coefficients). Single estimates 542 of the scalar products can be generated by taking the square of the absolute values 552 of the scalar products of the vector z. The single estimates can be multiplied 556 by D coefficients 554 (pre-computed combining coefficients shown above) to generate multiple weighted single estimates 544. The weighted single estimates can be summed 558 together to obtain an estimate for the interference and noise power 546.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A noise estimation filter for an orthogonal frequency-division multiplexed (OFDM) system, comprising:
   a filter bank module for multiplying a unitary vector by an OFDM signal vector to generate scalar products of the OFDM signal vector;
   a coefficient squaring module for squaring the scalar products and weighting the scalar products to generate a plurality of weighted single estimates; and
   a summing module for summing the plurality of weighted single estimates to generate a noise and interference power estimate.

2. The noise estimation filter of claim 1, wherein the unitary vector is an Eigen vector matrix of a channel covariance matrix.

3. The noise estimation filter of claim 1, wherein the coefficient squaring module further comprises:
   a squaring module for squaring the scalar product to generate a plurality of single estimates; and
   a coefficient multiplication module for weighting each of the single estimates with a noise coefficient forming the plurality of weighted single estimates.

4. The noise estimation filter of claim 3, wherein the noise coefficient is a positive constant represented by $$\frac{\lambda - \frac{1}{\delta^2}d_{hh,i}}{2\frac{1}{\delta^4}(d_{hh,i}+\delta^2)^2} \text{ when } \lambda \geq \frac{1}{\delta^2}d_{hh,i},$$

otherwise the noise coefficient has a zero value, where i represents reference signal 1 to n where n is a positive integer, $\lambda$ is a Lagrange multiplier, $d_{hh,i}$ is an Eigenvalue of a channel covariance matrix $\Lambda_{hh}$, and $\delta^2$ is a variance of the noise.

5. The noise estimation filter of claim 4, wherein the Lagrange multiplier $\lambda$ has a value $$\frac{1}{\delta^2}d_{hh,j} \geq \lambda \geq \frac{1}{\delta^2}d_{hh,k},$$

where $d_{hh,j}$ and $d_{hh,k}$ each represent at least one Eigenvalue for the channel covariance matrix.

6. The noise estimation filter of claim 3, wherein the coefficient multiplication module stores a plurality of noise coefficients and a sum of the plurality of noise coefficients has a value of one to provide a plurality of normalized noise coefficients.

7. The noise estimation filter of claim 3, wherein the coefficient multiplication module stores a plurality of noise coefficients and at least one of the plurality of noise coefficients has a value of zero.

8. The noise estimation filter of claim 3, wherein the unitary vector and the noise coefficient are computed prior to receiving a reference signal vector y.

9. The noise estimation filter of claim 1, wherein the OFDM signal vector is a vector of reference signals with a length of n number of reference signals, where n is a positive integer.

10. The noise estimation filter of claim 1, wherein the coefficient squaring module further comprises:
    a coefficient multiplication module for weighting the scalar product to form a weighted scalar product vector; and
    a squaring module for squaring the weighted scalar product vector to generate a the plurality of weighted single estimates.

11. The noise estimation filter of claim 1, wherein the noise and interference power estimate is used as an input in a noise mechanism selected from a group consisting of a channel quality indicator (CQI) report, a precoding matrix indicator (PMI) report, a transmission rank indicator (RI) report, a feedback reports, an interference mitigation, and whitening.

12. A method for estimating noise in an orthogonal frequency-division multiplexed (OFDM) system, comprising:
    multiplying a unitary vector by an OFDM signal vector using a filter bank module to generate scalar products of the OFDM signal vector;
    squaring the scalar product using a squaring module to generate a plurality of single estimates;
    weighting each of the single estimates with a noise coefficient using a coefficient multiplication module forming a plurality of weighted single estimates; and
    summing the plurality of weighted single estimates using a summing module to generate a noise power estimate.

13. The method of claim 12, wherein the unitary vector is an Eigen vector matrix of a channel covariance matrix.

14. The method of claim 12, wherein the noise coefficient is a positive constant represented by $$\frac{\lambda - \frac{1}{\delta^2}d_{hh,i}}{2\frac{1}{\delta^4}(d_{hh,i}+\delta^2)} \text{ when } \lambda \geq \frac{1}{\delta^2}d_{hh,i},$$

otherwise the noise coefficient has a zero value, where i represents reference signal 1 to n where n is a positive integer, $\lambda$ is a Lagrange multiplier, $d_{hh,i}$ is an Eigenvalue of a channel covariance matrix $\Lambda_{hh}$, and $\delta^2$ is a variance of the noise.

15. The method of claim 14, wherein the Lagrange multiplier $\lambda$ has a value $$\frac{1}{\delta^2}d_{hh,j} \geq \lambda \geq \frac{1}{\delta^2}d_{hh,k},$$

where $d_{hh,j}$ and $d_{hh,k}$ each represent at least one Eigenvalue for the channel covariance matrix.

16. The method of claim 12, wherein a sum of the plurality of noise coefficients has a value of one.

17. The method of claim 12, wherein the coefficient multiplication module stores a plurality of noise coefficients and at least one of the plurality of noise coefficients has a value of zero.

18. A computer program product, comprising a non-transitory computer readable medium having a computer readable program code embodied therein, said computer readable program code adapted to be executed to implement a method for estimating noise in an orthogonal frequency-division multiplexed (OFDM) system comprising:

multiplying a unitary vector by an OFDM signal vector to generate scalar products of the OFDM signal vector;

squaring the scalar products and weighting the scalar products by a noise coefficient to generate a plurality of weighted single estimates; and summing the plurality of weighted single estimates using to generate a interference and noise power estimate.

19. The computer program product of claim 18, wherein the unitary vector is an Eigen vector matrix of a channel covariance matrix.

20. The computer program product of claim 18, wherein a sum of the plurality of noise coefficients has a value of one, and the noise coefficient is a positive constant represented by $$\frac{\lambda - \frac{1}{\delta^2} d_{hh,i}}{2 \frac{1}{\delta^4}(d_{hh,i} + \delta^2)^2} \text{ when } \lambda \geq \frac{1}{\delta^2} d_{hh,i},$$

otherwise the noise coefficient has a zero value, where i represents reference signal 1 to n where n is a positive integer, $\lambda$ is a Lagrange multiplier, $d_{hh,i}$ is an Eigenvalue of a channel covariance matrix $\Lambda_{hh}$, and $\delta^2$ is a variance of the noise.

* * * * *